No. 621,381. Patented Mar. 21, 1899.
C. A. SPRAGUE & B. W. SEYMOUR.
FRUIT BASKET.
(Application filed July 27, 1898.)
(No Model.)
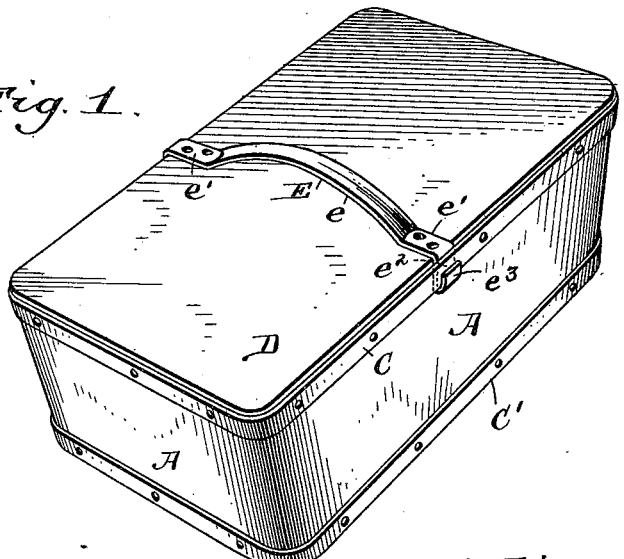
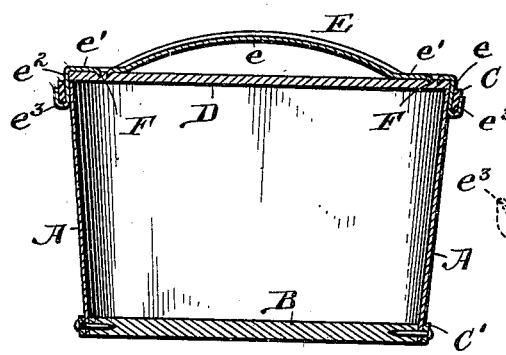
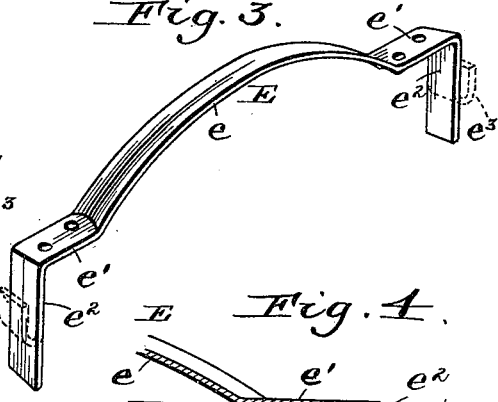
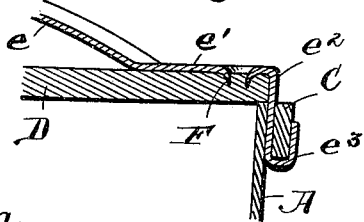
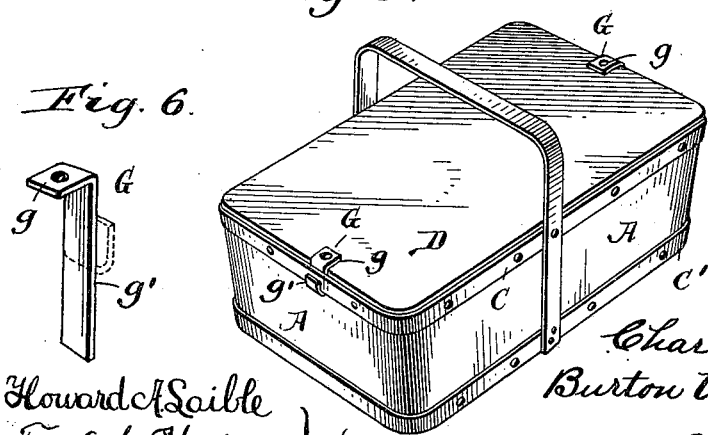
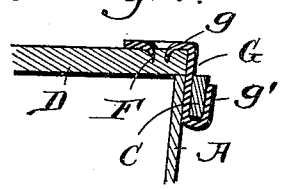
Charles A. Sprague,
Burton Webb Seymour,
Inventors.
By Emil Neuhart,
Attorney.
Howard A. Saible
Fred P. Hale
Witnesses.

UNITED STATES PATENT OFFICE.

CHARLES A. SPRAGUE AND BURTON WEBB SEYMOUR, OF STOCKTON, NEW YORK.

FRUIT-BASKET.

SPECIFICATION forming part of Letters Patent No. 621,381, dated March 21, 1899.

Application filed July 27, 1898. Serial No. 686,988. (No model.)

*To all whom it may concern:*

Be it known that we, CHARLES A. SPRAGUE and BURTON WEBB SEYMOUR, citizens of the United States, residing at Stockton, in the county of Chautauqua and State of New York, have invented certain new and useful Improvements in Fruit-Baskets, which improvements are fully set forth in the following specification and accompanying drawings.

The object of our invention is to provide a detachable handle which will at once support the basket and fasten the cover to the same and which prevents the sides of the basket from pressing inwardly against the fruit, thereby keeping the same in perfect condition.

A further object is to so construct the device as to combine durability and strength with lightness.

The invention consists of a detachable handle formed in one piece of any suitable material.

It consists of the handle portion, which is provided at each end with an extension having prongs adapted to be embedded in the cover, and a downwardly-bent portion adapted to pass between the body of the basket and the strengthening-band, the protruding end being bent upwardly against the outer side of the band to form a hook, and thus hold the handle securely to the basket.

Referring to the drawings, Figure 1 is a perspective view of a fruit-basket provided with our improvements. Fig. 2 is a transverse section through the basket on a line through the center of the handle. Fig. 3 is an enlarged detached perspective view of the handle. Fig. 4 is an enlarged transverse section through a portion of the basket at a point where the handle is secured to the same. Fig. 5 is a perspective view of a fruit-basket, showing our invention in a modified form. Fig. 6 is a detached perspective view of the fastening device used in the modified form. Fig. 7 is an enlarged section through a portion of the basket, taken through one of the fastening devices.

Like letters of reference refer to like parts in the several figures.

A represents the sides, and B the bottom, of the basket.

C C' are the bands, usually employed in baskets of this type for strengthening and stiffening the body of the basket.

D represents the cover, which is securely held on the basket by the handle, as hereinafter specified.

E represents the handle, which is formed of one piece of tin or any other suitable material. This handle is provided with a central curved portion $e$, which is concavo-convex in cross-section to be conveniently grasped by the hand, and has extensions $e'$ bearing on the cover D and downwardly-bent portions $e^2$, adapted to pass down between the body of the basket and the band C. This downwardly-bent portion is bent upwardly against the outer side of the band to form a hook $e^3$, and thus hold the handle securely to the basket. The extensions $e'$ of the handle are provided with downwardly-projecting prongs F, formed by puncturing the tin. These prongs are embedded in the cover and securely hold the same to the basket.

The hooks $e^3$ support the basket on taking hold of the handle and prevent the downwardly-bent portions $e^2$ from being withdrawn from their places between the body and the band of the basket.

The manner of attaching the handle to the basket is as follows: After filling the basket with fruit the cover is placed thereon. The handle is then placed so as to bring the downwardly-bent portion in a position directly over the space between the body of the basket and the band C. The handle is then pressed down to force the downwardly-bent portions $e^2$ between the band C and the body of the basket and to bring the extension $e'$ of the handle to rest on the cover, thus embedding the prongs into the cover. The ends of the downwardly-bent portions $e^2$ are then bent upwardly to bear against the outer side of the band, thus forming a light and durable handle.

The handle of the basket shown in Fig. 5 is of the usual form. In this figure the cover is held by the fastening devices G, which consists of two arms $g\ g'$. The arm $g$ is provided with the downwardly-projecting prongs F, which are adapted to be embedded in the cover of the basket, while the arm $g'$ passes down between the body of the basket and the band C, where it is bent against the outer side of the same, thereby holding the cover to the basket. The arm $g$, bearing against the cover and having its prongs embedded therein, prevents lengthwise and lateral movement of the same, while the arm $g'$, formed into a hook, prevents the lifting of the cover, thus insuring a perfect fastening.

By the construction of the handle as above described a light, but serviceable and inexpensive, handle is formed, which holds the cover securely to the basket and which can be readily detached or attached at will without the use of nails or other separate fastening devices, the whole being formed in one piece and serving as a combined handle and fastening device for holding the cover to the basket.

Having thus described our invention, what we claim as new is—

1. In a basket, the combination with the basket-body having a strengthening-band, and a cover, of a detachable handle having prongs adapted to be embedded in said cover and having its ends formed into hooks to engage said strengthening-band, substantially as set forth.

2. In a basket, the combination with the basket-body, and its cover, of a detachable handle having a central curved portion, and extensions adapted to bear against said cover, said extensions having downwardly-projecting prongs adapted to be embedded in the cover to hold the same to the basket, and means for securing said handle to the body of the basket, substantially as set forth.

3. In combination, a basket having a strengthening-band at or near its upper edge, a cover therefor, a detachable handle formed in one piece and having its central portion curved, its ends passing down between the body of the basket and said strengthening-band, and its intermediate portion bearing against the cover and provided with prongs adapted to be embedded in the cover, substantially as set forth.

4. The combination with the basket having a strengthening-band at or near its upper edge, and a cover, of fastening devices consisting of two arms, one arm bearing against the top of the cover and having prongs adapted to be imbedded therein, the other arm being approximately at right angles and passing down between the body of the basket and the strengthening-band and having its end bent upwardly to bear against the outer side of the strengthening-band, substantially as set forth.

In testimony whereof we affix our signatures in the presence of two witnesses.

CHARLES A. SPRAGUE.
BURTON WEBB SEYMOUR.

Witnesses:
T. W. GAGE,
T. C. WILLIAMS.